US008125989B2

(12) United States Patent
Kissel

(10) Patent No.: US 8,125,989 B2
(45) Date of Patent: Feb. 28, 2012

(54) SYSTEM AND METHOD FOR TRANSMITTING A DATA FLOW VIA BUNDLED NETWORK ACCESS LINKS AS WELL AS AN AUXILIARY TRANSMITTER AND RECEIVER DEVICE AND TRANSMISSION AND RECEIVING METHODS THEREFORE

(75) Inventor: Simon Kissel, Bingen am Rhein (DE)

(73) Assignee: Viprinte GmbH, Bingen am Rhein (DE)

( * ) Notice: Subject to any disclaimer, the term of this patent is extended or adjusted under 35 U.S.C. 154(b) by 97 days.

(21) Appl. No.: 12/046,788

(22) Filed: Mar. 12, 2008

(65) Prior Publication Data
US 2008/0253282 A1 Oct. 16, 2008

(30) Foreign Application Priority Data

Mar. 12, 2007 (DE) .................. 10 2007 012 143

(51) Int. Cl.
H04L 12/56 (2006.01)
H04L 12/28 (2006.01)
H04J 3/00 (2006.01)
H04J 3/24 (2006.01)
G06F 15/16 (2006.01)
G06F 15/173 (2006.01)

(52) U.S. Cl. ........ 370/389; 370/474; 370/476; 709/236; 709/238

(58) Field of Classification Search ................. None
See application file for complete search history.

(56) References Cited

U.S. PATENT DOCUMENTS

| | | | |
|---|---|---|---|
| 6,757,248 B1 * | 6/2004 | Li et al. .................. | 370/235 |
| 6,778,495 B1 * | 8/2004 | Blair ..................... | 370/230 |
| 7,142,508 B2 * | 11/2006 | Tobagi et al. ............ | 370/230 |
| 7,184,402 B1 | 2/2007 | Sharma et al. | |
| 7,817,552 B2 * | 10/2010 | Miyake et al. ............ | 370/235 |
| 2002/0010866 A1 | 1/2002 | McCullough et al. | |
| 2002/0089958 A1 * | 7/2002 | Feder et al. ............. | 370/338 |
| 2003/0199246 A1 * | 10/2003 | Friedman et al. .......... | 455/3.01 |
| 2003/0235206 A1 | 12/2003 | Heller | |
| 2004/0114635 A1 * | 6/2004 | Simon .................... | 370/522 |
| 2005/0188107 A1 * | 8/2005 | Piercey et al. ........... | 709/238 |
| 2006/0140181 A1 * | 6/2006 | Trumper et al. .......... | 370/389 |
| 2006/0215648 A1 * | 9/2006 | Jen ...................... | 370/389 |
| 2006/0253610 A1 * | 11/2006 | Yamada et al. ........... | 709/245 |
| 2009/0313690 A1 | 12/2009 | Bichot et al. | |

OTHER PUBLICATIONS

European Search Report, Feb. 10, 2010.
European Search Opinion, application No. 08 004 659.2, Feb. 10, 2010.

* cited by examiner

*Primary Examiner* — Xavier Szewai Wong
(74) *Attorney, Agent, or Firm* — Fay Sharpe LLP

(57) ABSTRACT

The present invention relates to a system for transmitting a data flow (a) from a transmitter device (1) to a receiver device (2) via a network (3) with a packet-based transmission protocol, in particular via the TCP/IP-based internet, with the devices (1) and (2) being connected to the network via network access links (4,4') and with a plurality of network access links (4,4') for bundling being disposed on the side of the transmitter device and/or receiver device, with an auxiliary transmitter device (5) being interconnected between the transmitter device (1) and the network access link(s) (4) and with an auxiliary receiver device (6) being interconnected between the network access link(s) (4') and the receiver device (2). The present invention also relates to a method of transferring a data flow via bundled network access links as well as to an auxiliary transmitter device and to an auxiliary receiver device and to a transmission and receiving method therefore.

27 Claims, 3 Drawing Sheets

SYSTEM AND METHOD FOR TRANSMITTING A DATA FLOW VIA BUNDLED NETWORK ACCESS LINKS AS WELL AS AN AUXILIARY TRANSMITTER AND RECEIVER DEVICE AND TRANSMISSION AND RECEIVING METHODS THEREFORE

CROSS REFERENCE TO RELATED APPLICATION

This application claims priority to and the benefit of the filing date of German Application No. 10 2007 012 143.3, filed Mar. 12, 2007, the disclosure of which is incorporated herein by reference, in its entirety.

TECHNICAL FIELD

The present invention relates to a system and to a method for transmitting a data flow via bundled network access links as well as to an auxiliary transmitter and receiver device therefore according to the preambles of claims 1, 5, 11, 14, 19 and 22.

TECHNICAL BACKGROUND

To transmit a data flow from a transmitter device to a receiver device via a network with a packet-based transmission protocol, in particular via the TCP/IP-based internet, network access links in the form of ISDN links, WLAN radio links, telephone lines or the like, are generally used to connect the transmitter device and the receiver device. The transmitter device distributes the data flow into consecutively numbered data packets and transmits these one after the other via the network access link to the network. In the network, the data packets are transferred into the direction of the receiver device where they are removed from the network via the network access link on the side of the receiver device and routed to the receiver device. There, the data packets are again lined up one after the other so as to obtain the data flow sent.

The data protocols generally accepted in practice for this type of transmission of a data flow, in particular the Transport Connection Protocol (TCP) built upon the Internet Protocol (IP), invariably take into account the possibility of the loss of data packets within the network. It is therefore the responsibility of the receiver device to newly request data packets that did not arrive and to acknowledge the receipt of data packets to the transmitter device. It is assumed that data packets are lost if data packets arriving one after the other at the receiver device are not consecutively numbered. Thus, for example, if a data packet numbered as number 5 arrives after a data packet numbered as number 2, it is assumed that the data packets No. 3 and 4 have been lost within the network. Therefore, after receipt of data packet No. 5, these data packets will again be requested by the receiver device from the transmitter device. In this manner, it is ensured that the complete data flow is transmitted.

This peculiarity of the transmission protocols used, however, leads to problems if a transmitter device (or a receiver device) is to be linked to the network simultaneously via a plurality of network access links so as to increase the useful bandwidth and the availability. In this case, the access links are "bundled," i.e. from the point of view of the transmitter device, combined to a single virtual link.

The data packets are subsequently distributed to a plurality of network access links to as to use the network access links at the same time. If, per data packet, the bundled network access links are identical with respect to bandwidth and transmission time and, in addition work with a synchronous clock generator, as is the case, for example, for the so-called ISND channel bundling, the sequence in which the data packets arrive in the receiver device can be controlled nearly as well as when a single network access link is used.

If, on the other hand, the bundled network access links differ with respect to bandwidth and/or transmission time and/or if no synchronous clock generator is used, it is not possible to ensure that the data packets arrive in the correct sequence in the receiver device.

For example, if a network access link with a transmission time of 100 ms and an additional network access link with a transmission time per data packet of 250 ms are bundled, the data packets transmitted via the first data link will always arrive more rapidly in the receiver device than the data packets transmitted via the second network access link. If the data flow in the transmitter device, for example, is distributed to the network access links in such a manner that the first data packet is transmitted via the first network access link, the second data packet is transmitted via the second network access link, the third packet is transmitted via the first network access link, the fourth packet is transmitted via the second network access link, etc., the data packets, due to the differences in the transmission time, will arrive in the receiver device as follows:

After 100 ms: The first data packet arrives via the network access link 1.
After 200 ms: The third data packet arrives via the network access link 1.
After 250 ms: The second data packet arrives via the network access link 2.
After 300 ms: The fifth data packet arrives via the network access link 1.
After 400 ms: The seventh data packet arrives via the network access link 1, etc.

Thus, because of the different transmission times in the two network access links, data packets in the first network access link will overtake packets in the second network access link. As a result, the data packets will arrive in the wrong sequence in the receiver device. The wrong sequence leads to a considerable number of repeated requested data packets. In addition, the transmitter device reacts to such new requests and or to the absence of receipt acknowledgments by slowing down the data transmission rate.

In addition, in practice, the transmission times of the network access links will vary so that the sequence of the receipt of the data packets is unpredictable. This is the case even if the theoretical transmission time of the data packets in the network access links were to be nearly identical but the bandwidths of the bundled network access links are different. The reason is that, because of the intermediate buffer, the available bandwidth influences the actual transmission time of a data packet as a function of the capacity utilization. Thus, in practice, today's broadband internet access links, e.g., DSL, are implemented in the form of a so-called "shared medium" in which a plurality of participants of a local network share the available bandwidth in the distribution network. This leads to continuously fluctuating line properties with respect to the bandwidth and thus the transmission time, as a result of which the distribution of data packets to a plurality of network access links necessarily leads to incorrectly sorted data packets in the receiver device.

Therefore, in practice, connecting a second network access link with the same bandwidth does not lead to the theoretical doubling of the useful bandwidth. Instead, the useful bandwidth is, if at all, only marginally increased. Frequently, failures and considerable delays in the data transfer occur as a result of the large number of repeated requests for data packets and by the slowdown of the data transmission rate.

The obvious approach, i.e., to newly re-sort the data packets in the receiver device based on the sequence number involved, is not practicable. Since the IP protocol does not guarantee delivery, i.e., since data packets can be lost, such an approach would collide with the recognition of losses of data packets. If, after the first data packet, the receiver receives next the third packet instead of the second data packet, it is impossible for the receiver device to determine whether this happened because the third data packet has overtaken the second packet, i.e., whether "packet reordering" took place along the transport path, or whether the second data packet has been lost en route and therefore will not arrive without the relevant repeated request.

As a result, the prior art can offer only two practicable approaches for bundling a plurality of network access links.

According to the first approach, only network access links that have exactly the same properties with respect to bandwidth and transmission time are bundled. In this case, the bundled network access links work with a synchronous clock generator. This is the case, e.g., in ISDN channel bundling. This ensures that the data packets actually arrive in the correct sequence in the receiver device.

According to the second approach, different network access links are bundled; however, per data flow to be transmitted, only one of the bundled network access links is used. n available links can therefore be fully utilized only if at least n data flows independent of one another exist simultaneously and if the number of data flows can be divided without remainder by the number of the network access links.

PROBLEM

Using this as a starting point, the problem to be solved by the present invention is to make available a system and a method for transmitting a data flow via bundled network access links as well as a transmitter device and a receiver device and a transmission and a receiving method therefore according to the precharacterizing portion of claims 1, 5, 11, 14, 19 and 22, which allow the bundling of network access links with a relevant increase in the useful bandwidth.

This problem is solved by the characteristics of claims 1, 5, 11, 14, 19 and 22.

BRIEF DESCRIPTION OF THE INVENTION

The present invention makes available systems and methods by means of which asynchronous bundling of network access links for utilization with the internet protocol becomes possible.

According to the present invention, it is possible to bundle any number of highly different network access links. By combining different types of physical links, the failure risk of the overall connection is reduced since, in contrast to synchronous bundling, a failure will affect only one type of link. If one of the bundled network access links fails, e.g., because the provider resets or disconnects the DSL link every 24 h, all TCP/IP links remain open, at least as long as one of the other bundled network access links is still able to function; according to the present invention, software, such as Skype, need not re-establish a new connection and renegotiate parameters so that in effect a dedicated line is obtained.

As a result of bundling according to the present invention, the overall bandwidth of internet connections can be increased in any increments. In addition, failure safety can be ensured by way of the number of network access links. The overall availability increases nearly exponentially with the number of network access links. Thus, the combination of two independent network access links with an availability of 98% each results in an overall availability of 99.96%.

According to the present invention, network access links are bundled within any physical section of an end-to-end TCP/IP connection without adjustment and knowledge of the participating communication endpoints. The section can extend between two computers which are connected via DSL or the like with the network, or between one computer, that is connected via such a connection to the network, and an internet node, e.g., at the internet backbone, or between two sections in the internet, e.g., two distribution nodes, or between two networks, etc.

The TCP/IP protocol is end-to-end-based. i.e. the endpoints of a connection must independently inform one another about the receipt or the absence of a data packet. Therefore, the methods and systems according to the present invention act in a manner "invisible" to the endpoints. Thus, the transmitting endpoint continues to receive receipt acknowledgments, i.e., from the auxiliary transmitter device, in the name of the receiving endpoint which in turn expects the receipt of data packets of a data flow in the correct sequence.

Thus, according to the present invention, the TCP layer is completely decoupled from the transport behavior of the bundled network access links. As a result, a potential mutual interference is excluded. This is implemented in that a virtual reality is simulated for the endpoints. To this end, "a man in the middle" in the form of an auxiliary transmitter device and an auxiliary receiver device, which can both be physically designed in the form of a printed circuit card or a router or the like or even as a software layer, appears to both sides, one under the identity of the opposite side. In this manner, a simulated picture about the transport behavior in the network access links is conveyed to the TCP endpoints. Preferably, they receive the information channeled into the data flow that all sent data packets of an existing connection have immediately been confirmed by the receiving endpoint and may therefore be forwarded at full speed.

On the side of the receiving endpoint, all data packets coming from the bundled network access links are stored in an intermediate buffer and correctly sorted according to the present invention. For the transmitting endpoint, this delay is irrelevant since the receipt of all data packets had already been confirmed to it in advance so that the immediate transmission of further data packets is possible. According to the present invention, all real acknowledgment packets potentially inconsistent therewith can be filtered out by the receiving endpoint.

Since, due to the fact that because of the auxiliary transmitter device and the auxiliary receiver device, the TCP endpoints are entirely decoupled from the actual transport through the network, said endpoints do not receive any information about the status of the transport situation, the auxiliary devices are responsible for the administration of the data transfer.

To this end, a separate transport protocol is used between the auxiliary devices, which protocol is designed to distribute data packets and to sort data packets. Because this protocol is totally decoupled from the TCP/IP layer, freedom of choice exists: The transport between the auxiliary devices can take place by means of any suitable protocols. An encrypted VPN connection based on the SSL/TLS process is useful. This creates a so-called "tunnel." Data packets which, coming from outside, are to be transported via the bundled network access links, are encapsulated in an encrypted container packet in which they are transferred.

The incoming data flow is preferably distributed to a plurality of data flows which corresponds to the number of network access links at the auxiliary transmitter device that are active at the time, i.e., that are able to transmit preferably at a sufficiently high transmission rate. The manner in which the data packets of the incoming data flow are distributed to the outgoing data flows can preferably be continuously newly determined depending on the capacity utilization of the respective network access links.

Additional embodiments, characteristics and advantages of the present invention follow from the attached drawings, the claims and the following description.

DESCRIPTION OF THE PREFERRED EMBODIMENTS

A. System According to the Present Invention

Figure 1:
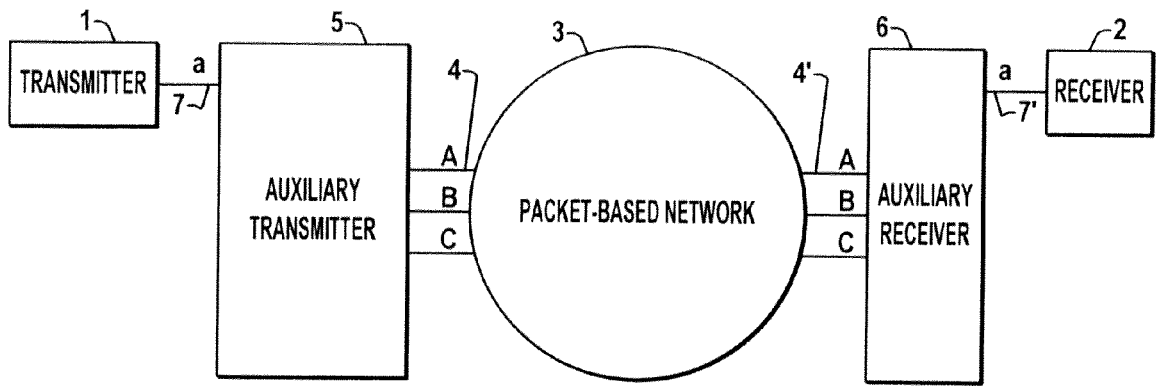
FIG. 1 illustrates an embodiment of the system according to the present invention.

The system shown in FIG. 1 for transmitting a data flow a from a transmitter device 1, e.g., from a computer of a branch office of a company, to a receiver device 2, e.g., a computer in the principal office of the company, via a packet-based network 3, in particular the internet, which is connected via physical network access links 4,4' that are coupled by wire and/or wirelessly in pairs to end-to-end connections, such as DSL links, WLAN links, telephone lines, UMTS links and the like, comprises an auxiliary transmitter device 5 and an auxiliary receiver device 6.

Figure 2:
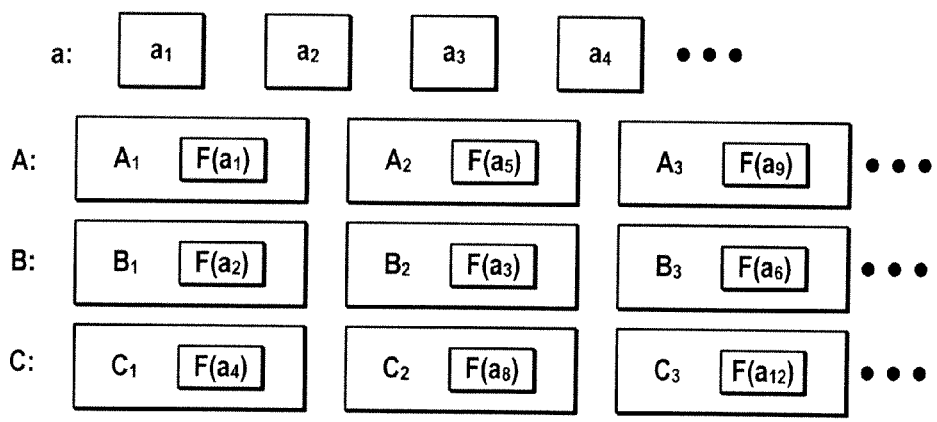
FIG. 2 illustrates data flows with data packets.

The transmitter device 1 transmits a data flow a in the form of data packets $a_i$, i=1, 2, 3 . . . , according to a standardized protocol, in particular according to the TCP/IP protocol, see FIG. 2. The data flow a is addressed to the receiver device 2. Thus, the transmitter device 1 and the receiver device 2 are connected to an end-to-end connection according to the TCP/IP standard, which end-to-end connection is formed between the IP address in the transmitter device 1 and the IP address of the receiver device 2.

The data flow a reaches the auxiliary transmitter device 5 via a wired or a wireless connection 7. There, the data packets $a_i$ are distributed, optionally encrypted as $f(a_i)$ with a function f, and encapsulated in data packets $A_i, B_i, C_i$, i=1, 2, 3 . . . .

Subsequently, the data packets $A_i, B_i, C_i$ are routed to the network 3 via the network access links 4, i.e., as data flows A,B,C invisible to the transmitter device 1. In the network 3 which can be the internet or any other network with any protocol, the data packets $A_i, B_i, C_i$ are transmitted using the relevant protocol, in this case, for example, the TCP/IP protocol, into the direction of the receiver device 6, preferably to a specific network access link 4'. To this end, a unique IP address is dedicated to each network access link 4,4', and the six network access links 4,4' in the embodiment shown are coupled in pairs to form three end-to-end connections so that three independent transmission channels are formed between the auxiliary transmitter device 5 and the auxiliary receiver device 6, i.e., one for each of the three data flows A,B,C.

The data packets $A_i, B_i, C_i$ leave the network 3 via the network access links 4' dedicated to each data flow and reach the auxiliary receiver device 6. There, they are stored in an intermediate buffer. Subsequently, the data packets $f(a_i)$ are decapsulated, decrypted and sorted. Lastly, via a line 7', they are transmitted according to the TCP/IP protocol in the correct sequence to the receiver device 2.

The transmitter device 1 and the receiver device 2 are entirely decoupled from the administration of the network access links 4,4' and the processing and administration of the data packets $A_i, B_i, C_i$. From the viewpoint of the transmitter device 1, only line 7 exists, while from the viewpoint of the receiver device 2, only line 7' exists, and both the transmitter device 1 and the receiver device 2 see only the end-to-end connection that connects them but not the end-to-end connections between the network access links 4,4'.

In other embodiments of the present invention, the auxiliary receiver device 6 is not disposed within the network of the receiver device 2. It can be disposed, for example, in a service provider. In such a case, line 7' is a sufficiently fast connection on the side of the service provider to the internet or to another network in which the receiver device is disposed. The same applies to the auxiliary transmitter device 2 [sic; 5]; again, the transmitter device 1 can be disposed in a different network. The section between the auxiliary transmitter device 5 and the auxiliary receiver device 6 can thus be any section of an end-to-end connection between a transmitter device 1 and a receiver device 2.

In an especially preferred embodiment, the auxiliary receiver device 6 is, so-to-speak, part of the internet backbone, i.e., it can, e.g., be connected at a network provider directly with an internet node. In this case, only one network access link 4' is required, which network access link is preferably designed as a leased line or a permanent connection, for example, in the form of a cable which is dimensioned for a sufficient data throughput. The auxiliary receiver device 6 may, but need not, have an IP address as such dedicated to it; instead, in this case, all data can invariably first be transmitted automatically from one or more or all customers of the network provider to the auxiliary receiver device 6 which further processes said data and subsequently distributes them appropriately in the network 3.

Optionally, auxiliary receiver devices 6 are already provided in the distribution stations of the network 3. In these embodiments of the present invention, it is especially useful if the auxiliary receiver device 6 is a software layer which runs in a server or a network service computer or the like.

The number of the network access links 4,4' is freely scalable to meet the requirements. Thus, especially two or more than three network access link 4,4' can be provided. It is also possible to couple either the auxiliary transmitter device 5 or the auxiliary receiver device 6 with only one network access link 4,4' to the network 3. Lastly, the number of network access links 4 can differ from the number of network access links 4'. Thus, e.g., the number of the network access links 4 can be one, two, three or four, and the number of the network access links 4' can be two or three or four, one or three or four, one or two or four, or one or two or three.

The network access link(s) 4' should always be able to receive at least the data throughput of all network access links 4. Since the network access links 4, as a rule, are dial-in connections with a limited data throughput, such as DSL or UMTS links of computers in decentralized sites, a single network access link 4' in the form of a gigabyte LAN or coupling to an internet backbone may suffice.

The roles played by the transmitter device 1 and the receiver device 2 are exchangeable, i.e., data transmission can also take place in the reverse direction. Specifically, the auxiliary transmitter device 5 can also handle, i.e., receive, a data flow in the reverse direction. The same applies to the auxiliary receiver device 6 which can also transmit a data flow. As a result, a bidirectional connection via bundled network access links 4 and/or 4' is possible.

B. Method According to the Present Invention

The method according to the present invention will be explained using a preferred practical example solely by way of an example based on the TCP/IP protocol.

The data transmission between the transmitter device 1 and the receiver device 2 is illustrated with reference to FIG. 3 in which the terms "SYN," "ACK," and "FIN" originating in the TCP/IP protocol identify packets for the establishment of a connection, for the receipt acknowledgment and for the connection release, and in which the transmitter device 1 is called the client, the auxiliary transmitter device 5 is called router A, network 3 is called the internet, the auxiliary transmitter device 6 is called router B, and the receiver device 2 is called the server.

Figure 3:
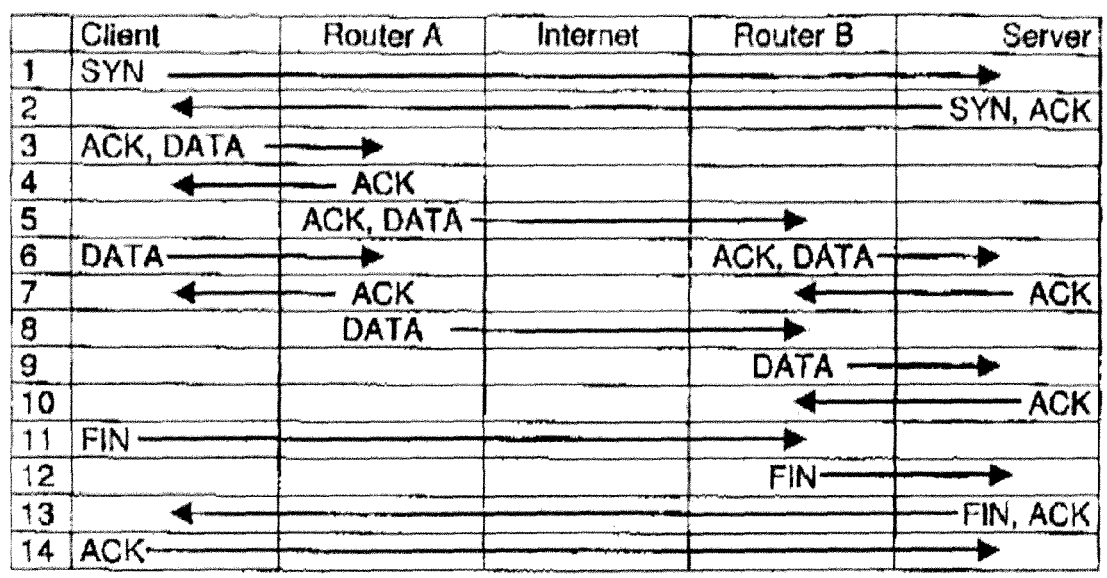
FIG. 3 illustrates an embodiment of the method according to the present invention.
Figure 4:
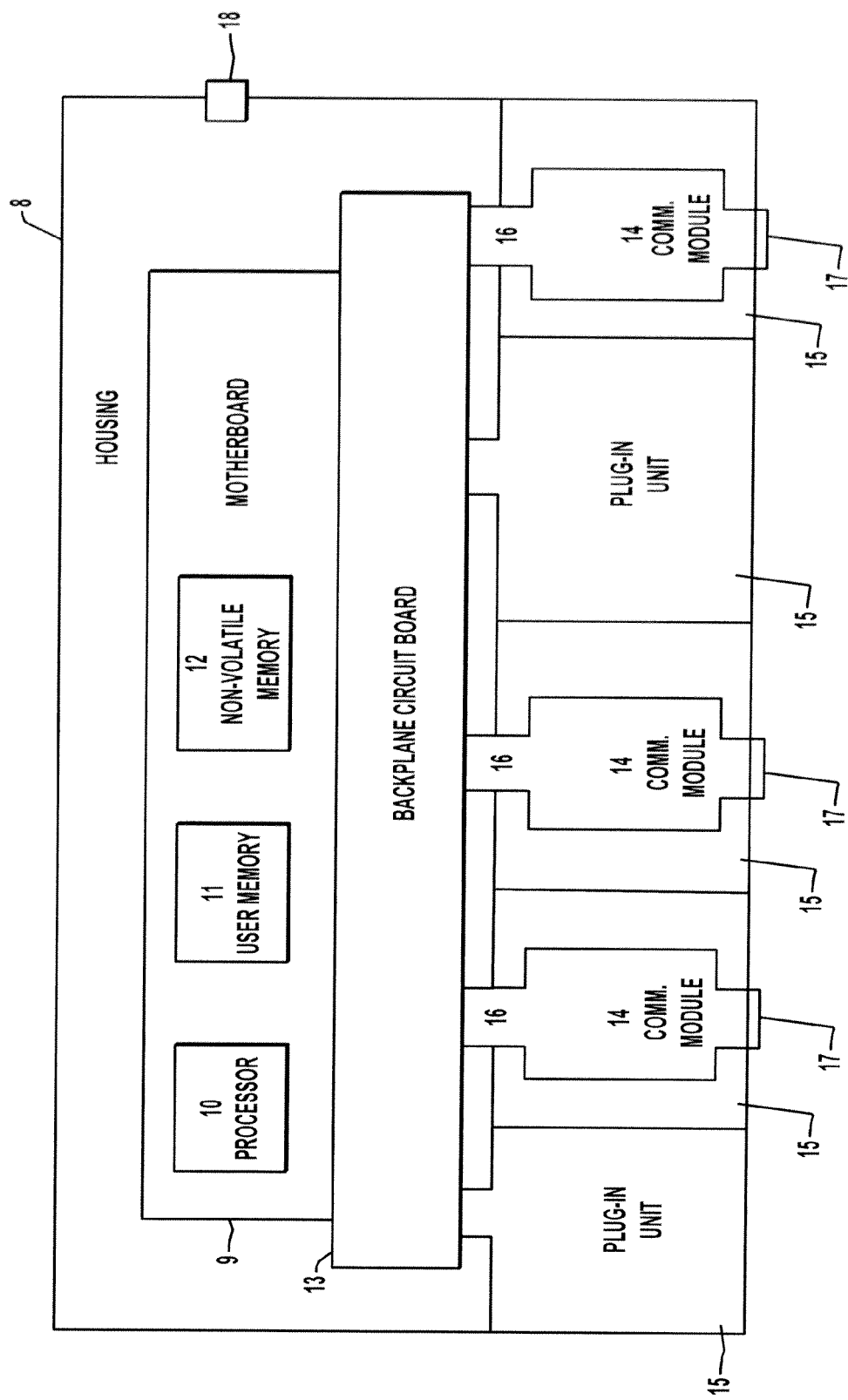
FIG. 4 illustrates an embodiment of the auxiliary transmitter device according to the present invention.

To establish an end-to-end connection between the transmitter device 1 and the receiver device 2, the transmitter device 1 sends a SYN packet to the receiver device 2 (line 1 in FIG. 3). Since the auxiliary transmitter device 5 which simulates the transmitter device 2 cannot yet know at this point in time whether the receiver device 2 can be reached and will agree to the establishment of the connection, no receipt acknowledgment will be simulated for the data packets that are needed to establish the connection and no storage in an intermediate buffer will take place. The data packets are encrypted and encapsulated without confirmation in the auxiliary transmitter device 5 and forwarded via any one of the network access links 4 connected to said auxiliary transmitter device, the network 3 and the network access links 4' to the auxiliary receiver device 6 which in turn transmits the decapsulated and decrypted data packet to the receiver device 2.

If the receiver device 2 agrees to the establishment of a connection, it returns an ACK packet (line 2 in FIG. 3) which, like the SYN packet, is returned by the auxiliary receiver device 6 and the auxiliary transmitter device 5 directly to the transmitter device 1.

The transmitter device 1 confirms receipt of the ACK packet with an ACK packet of its own (TCP three-way handshake). Thus, the end-to-end connection between the transmitter device 1 and the receiver device 2 has been established. In conjunction with the ACK packet, the transmitter device 1 can immediately transmit data (line 3 in FIG. 3).

At this point, buffering integrated into the auxiliary transmitter device 5 is activated. The data packet as obtained is stored in the intermediate buffer of the auxiliary transmitter device 5. The auxiliary transmitter device 5 generates a receipt acknowledgment for the data packet as obtained and sends said receipt acknowledgment via line 7 to the transmitter device 1 (line 4 in FIG. 3).

Subsequently (line 5 in FIG. 3), the data packet $a_i$ is encrypted as $f(a_i)$ and encapsulated in the auxiliary transmitter device 5 and sent via network 3 to the auxiliary receiver device 6 which now also activates its buffer. At this point in time, the transmitting and receiving points of the TCP/IP protocol are decoupled. Therefore, the auxiliary transmitter device 5 can transmit the encapsulated data packet via any one of the network access links 4 as $A_i, B_i, C_i$ and, after encryption and encapsulation, distribute any following data packets $a_i$ to other network access links 4 so that these are transmitted in parallel, it being useful to take the actual bandwidth and capacity utilization of the network access links 4 into account so as to optimize the transmission. On arrival in the auxiliary receiver device 6, the data packets $A_i, B_i, C_i$ are decapsulated, possibly decrypted, and correctly sorted so that the data packets $a_i$ are obtained again.

As soon as data packets $a_i$ are present in the sequence expected by the receiver device 2, said data packets are forwarded to the receiver device 2 (line 6 in FIG. 3).

The receiver device 2 acknowledges receipt of these data packets $a_i$ with an ACK packet (line 7 in FIG. 3). The ACK packet is transmitted via line 7' to the auxiliary receiver device 6. Since the transmitter device 1 has already received (line 4 in FIG. 3) an ACK packet for the data packet $a_i$ from the auxiliary transmitter device 5, there is no need for the auxiliary receiver device 6 to further process the ACK packet coming from the receiver device 2 but can instead optionally dispose of it after internal acknowledgment.

As soon as the transmitter device 1 has received the ACK packet (line 4 in FIG. 3), it immediately transmits the next data packet $a_{i+1}$ (line 6 in FIG. 3) even before the preceding data packet $a_i$ has actually been received by the receiver device 2. The method according to the present invention ensures that the transmitter device 1 is able to transmit additional data packets $a_i$ without interruption at a high transmission rate. In addition to the effect that this decoupling allows a parallel transmission of the data via a plurality of network access links, the transmission is accelerated and optimized since the transmitter device 1 need not take a break to wait for acknowledgement receipts (ACK) from a potentially remote receiver device 2. As an additional effect, the technical limitations of the TCP protocol in the form of a maximum number of data that can be sent without receipt of a receipt acknowledgment are avoided.

After all data of a data flow a have been transmitted in the form of data packets $a_i$ by the transmitter device 1 via line 7 to the auxiliary transmitter device 5, the connection can be released. To this end, a FIN packet is transmitted by the transmitter device 1 to the auxiliary transmitter device 5 (line 1 in FIG. 3).

Like the SYN packet (line 1 in FIG. 3), such a FIN packet is routed by the auxiliary transmitter device 1 to the auxiliary receiver device 6. There, the FIN packet is stored in the intermediate buffer (line 12 in FIG. 3).

Only after the auxiliary receiver device 6 has received all still outstanding data packets $A_i, B_i, C_i$ from the auxiliary transmitter device 5 and preferably only after the receiver device 2 has received and confirmed all decapsulated and decrypted data packets as still stored in the intermediate buffer of the auxiliary receiver device 6 is the FIN packet stored in the intermediate buffer of the auxiliary receiver device 6 forwarded and the internal packet buffer deactivated for this connection.

Next, the receiver device 2 acknowledges the FIN packet with a FIN/ACK packet. The FIN/ACK packet is transmitted by the auxiliary receiver device 6, again without processing and without a simulated receipt acknowledgment, via the auxiliary transmitter device 6 to the transmitter device 1 (line 13 in FIG. 3).

The transmitter device 1 acknowledges receipt with an ACK packet which is forwarded without having been processed via the auxiliary transmitter device 5 and the auxiliary receiver device 6 to the receiver device 2 (line 14 in FIG. 3).

Thus, the end-to-end connection between the transmitter device 1 and the receiver device 2 is closed.

As soon as buffering has been activated, both the auxiliary transmitter device 5 and the receiver device [sic; auxiliary receiver device] 6 are able to randomly buffer and newly sort data packets $a_i$. This makes it possible for the auxiliary transmitter device 1 to randomly distribute data packets $a_i$ received from the transmitter device 1 to connected network access links 4. As a result of this, the data packets $a_i$ arrive in the wrong sequence in the auxiliary receiver device 6. There, however, they are stored in the intermediate buffer and newly sorted until data packets $a_i$ are available in the sequence expected by the receiver device 2. Only then are the data packets a forwarded to the receiver device 2.

In this manner, the bundled transmission of individual data flows a is possible via a plurality of network access links 4 and/or 4'.

If one of the network access links 4,4' used were to fail during the transmission between the auxiliary transmitter device 5 and the auxiliary receiver device 6, the auxiliary transmitter device 5 would transmit any lost data packets again via another one of the network access links 4 to the auxiliary receiver device 6. The protocol used for this purpose between the auxiliary transmitter device 5 and the auxiliary receiver device 6 is exchangeable and will not be further described in this context. Thus, failure of one of the bundled network access links 4,4' does not cause a discontinuation of the end-to-end connection between the auxiliary transmitter device 5 and the auxiliary receiver device 6 and between the transmitter device 1 and the receiver device 2 as long as at least one network access link 4 and one network access link 4' continue to function.

C. Auxiliary Transmitter Device

Next, an embodiment of the auxiliary transmitter device 5 will be described with reference to FIG. 3. Since the auxiliary transmitter device 5, in the case of a reverse direction of the data flow, can assume the function of the auxiliary receiver device 6 and vice versa, the following also applies to the auxiliary receiver device 6; said auxiliary receiver device can furthermore be of identical design.

The auxiliary transmitter device 5 shown has been implemented in the form of a hardware router. It comprises a housing 8 in which a motherboard 9 with a processor 10, a user memory 11 and a non-volatile memory 12 are disposed. The above-described method according to the present invention is implemented on the motherboard 9 in the form of software. A so-called "backplane" circuit board 13 that is connected to the motherboard 9 makes available interfaces between the motherboard 9 and communication modules 14 which can be inserted into plug-in units 15 of the housing 8. The communication modules 14 can be designed for identical or different network access links 4. For example, a communication module 14 can be designed for a DSL network access link while another communication module 14 can be designed for an ISDN network access link and still another communication module can be designed for a WLAN network access link. Each of the communication modules 14 preferably has a hotplug-capable plug-in connector 16 so as to allow it to be inserted into or to be removed from the backplane circuit board 13 when the auxiliary transmitter device 6 is energized.

The communication modules 14 comprise suitable connector means 17, for example, in the form of socket connectors, for connection with an associated network access link.

In addition, the housing preferably comprises a LAN socket connector 18 or the like which is connected with the motherboard 9. Via this LAN socket connector 18, the auxiliary transmitter device 5 can be connected to line 7 (FIG. 7), in particular to a LAN.

A data packet $a_i$, which arrives via line 7 and which is to be transmitted via bundled network access links 4 to the auxiliary receiver device 6, reaches the auxiliary transmitter device 5 via the LAN socket connector 18 and is sent to the motherboard 9. The motherboard 9 at this point already confirms receipt of the data packet $a_i$ which has not yet arrived at the receiver by transmitting an acknowledgment packet via the LAN socket connector 8. Subsequently, the data packet $a_i$ is encrypted, adapted by encapsulation to the transmission protocol of network 3 used between the auxiliary transmitter device 5 and the auxiliary receiver device 6 and forwarded to one of the communication modules 14. The selection is preferably made with a view to the readiness of the communication module 14 involved (cable connected, network connection exists) and its existing capacity utilization. The communication module 14 receives the encapsulated data packet and transmits it via the appropriate network access link 4.

The network access link 4 ends at the internet backbone of the link provider, i.e., at network 3. From here, the data packets $A_i, B_i, C_i$ are transmitted like normal IP data packets to the auxiliary receiver device 6. There, they are decapsulated, sorted into the correct sequence, decrypted and recombined into the original data flow a. The original data flow is subsequently output via the LAN socket connector of the auxiliary receiver device 6, which can be identical in design to the auxiliary transmitter device 5, via line 7' to the receiver device 2.

The method implemented on the motherboard 9 can also be implemented directly in the transmitter device 1 and/or in the receiver device 2. In this case, the auxiliary transmitter device 5 and/or the auxiliary receiver device 6 is/are a printed circuit card or a software layer for a PC or server or the like. If it is a software layer, the transmitter device 1 and/or the receiver device 2 comprise the connecting means 17, e.g., directly on the motherboard or in the form of DSL or WLAN expansion adapters for a PC. The method according to the present invention is then implemented as a program layer on the PC. To this end, it is implemented in the transmitter device 1 as a layer separate from that for the TCP/IP transmission, which layer receives data from the TCP/IP layer, acknowledges the receipt of the data packets $a_i$ to the TCP/IP layer, encrypts and packages the data packets $a_i$ and divides them into at least two data flows A,B and dedicates one of the data flows A,B to one of the network access links 4. The same applies similarly to the receiver device 2 in which the auxiliary receiver device 6 can be implemented as a layer separate from that for the TCP/IP transmission.

LIST OF REFERENCE NUMERALS

1 Transmitter device
2 Receiver device
3 Network
4,4' Network access link
5 Auxiliary transmitter device
6 Auxiliary receiver device
7,7' Line
8 Housing
9 Motherboard
10 Processor
11 User memory
12 Non-volatile memory
13 Backplane circuit board
14 Communication module
15 Plug-in unit
16 Plug-in connector
17 Connecting means
18 LAN socket connector

The invention claimed is:

1. A system for transmitting a data flow, comprising:

an auxiliary transmitter device interconnected between a transmitter device acting as an endpoint and a plurality of bundled network access links of a network, the plurality of bundled network access links including at least two network access links differing from one another with respect to at least one of bandwidth and transmission time, the auxiliary transmitter device being configured:

to encapsulate data packets of a data flow provided by the transmitter device for delivery to a receiver device acting as another endpoint via an end-to-end-based transmission protocol in which the transmitter device and the receiver device must independently inform one another about the receipt or absence of a data packet, to transmit the encapsulated data packets via the plurality of bundled network access links of the network, and to provide receipt acknowledgments to the transmitter device for the transmitted encapsulated data packets in the name of the receiver device independent of receipt acknowledgments generated by the receiver device; and an auxiliary receiver device interconnected between the plurality of bundled network access links and the receiver device, the auxiliary receiver device being configured to receive and decapsulate the transmitted encapsulated data packets of the data flow and to route the decapsulated data packets in the sequence of the data flow to the receiver device.

2. The system of claim 1, wherein the auxiliary transmitter device is configured to provide receipt acknowledgments to the transmitter device for individual data packets of the data flow prior to encapsulating the individual data packets.

3. The system of claim 1, wherein the auxiliary transmitter device is configured to distribute encapsulated data packets of the data flow to a number of the plurality of bundled network access links representing the number of the network access links that are active at the time of transmission.

4. The system of claim 3, wherein the auxiliary transmitter device is configured to continuously determine the manner in which the encapsulated data packets of the data flow are distributed to the plurality of bundled network access links based on the capacity utilization of the respective network access links.

5. The system of claim 1, wherein the auxiliary transmitter device is configured to distribute the encapsulated data packets of the data flow to outgoing data flows, and wherein exactly one of the network access links is dedicated to each outgoing data flow.

6. The system of claim 1, wherein the auxiliary transmitter device is configured on failure of one of the plurality of bundled network access links, to again transmit any lost data packets via another one of the network access links to the auxiliary receiver device.

7. The system of claim 1, wherein the auxiliary transmitter device is configured to encapsulate the data packets of the data flow in their entireties without fragmentation.

8. The system of claim 1, wherein the an end-to-end-based transmission protocol is a TCP/IP protocol.

9. The system of claim 1, wherein the receiver device does not perform reordering of received packets from the transmitter device according to the end-to-end-based transmission protocol.

10. An auxiliary transmitter device for transmitting an incoming data flow provided by a transmitter device acting as an endpoint for delivery to a receiver device acting as another endpoint through a network via an end-to-end-based transmission protocol in which the transmitter device and the receiver device must independently inform one another about the receipt or absence of a data packet, the auxiliary transmitter device being configured:

to encapsulate data packets of the incoming data flow;

to transmit the encapsulated data packets via a plurality of bundled network access links of the network, the plurality of bundled network access links including at least two network access links differing from one another with respect to at least one of bandwidth and transmission time; and to provide receipt acknowledgments to the transmitter device for the transmitted encapsulated data packets in the name of the receiver device independent of receipt acknowledgments generated by the receiver device.

11. The auxiliary transmitter device of claim 10, wherein the auxiliary transmitter device is configured to provide receipt acknowledgments to the transmitter device for individual data packets of the data flow prior to encapsulating the individual data packets.

12. The auxiliary transmitter device of claim 10, wherein the auxiliary transmitter device is configured to distribute encapsulated data packets of the data flow to a number of the plurality of bundled network access links representing the number of the network access links that are active at the time of transmission.

13. The auxiliary transmitter device of claim 12, wherein the auxiliary transmitter device is configured to continuously determine the manner in which the encapsulated data packets of the data flow are distributed to the plurality of bundled network access links based on the capacity utilization of the respective network access links.

14. The auxiliary transmitter device of claim 10, wherein the auxiliary transmitter device is configured to distribute the encapsulated data packets of the data flow to outgoing data flows, and wherein exactly one of the network access links is dedicated to each outgoing data flow.

15. The auxiliary transmitter device of claim 10, wherein the auxiliary transmitter device is configured on failure of one of the plurality of bundled network access links, to again transmit any lost data packets via another one of the network access links.

16. The auxiliary transmitter device of claim 10, wherein the auxiliary transmitter device is configured to encapsulate the data packets of the data flow in their entireties without fragmentation.

17. The auxiliary transmitter device of claim 10, wherein the an end-to-end-based transmission protocol is a TCP/IP protocol.

18. The auxiliary transmitter device of claim 10, wherein the receiver device does not perform reordering of received packets from the transmitter device according to the end-to-end-based transmission protocol.

19. A method of transmitting a data flow via a network, the method comprising:

interconnecting an auxiliary transmitter device between a transmitter device acting as an endpoint and a plurality of bundled network access links of the network, the plurality of bundled network access links including at least two network access links differing from one another with respect to at least one of bandwidth and transmission time, using the auxiliary transmitter device, encapsulating data packets of the data flow;

using the auxiliary transmitter device, transmitting the encapsulated data packets via the plurality of bundled network access links of the network for delivery to a receiver device acting as another endpoint via an end-to-end-based transmission protocol in which the transmitter device and the receiver device must independently inform one another about the receipt or absence of a data packet; and using the auxiliary transmitter device, providing receipt acknowledgments to the transmitter device for the transmitted encapsulated data packets in the name of the receiver device independent of receipt acknowledgments generated by the receiver device.

20. The method of claim 19, further comprising, using the auxiliary transmitter device, providing receipt acknowledgments to the transmitter device for individual data packets of the data flow prior to encapsulating the individual data packets.

21. The method of claim 19, further comprising, using the auxiliary transmitter device, distributing encapsulated data packets of the data flow to a number of the plurality of bundled network access links representing the number of the network access links that are active at the time of transmission.

22. The method of claim 21, further comprising, using the auxiliary transmitter device, continuously determining the manner in which the encapsulated data packets of the data flow are distributed to the plurality of bundled network access links based on the capacity utilization of the respective network access links.

23. The method of claim 19, further comprising, using the auxiliary transmitter device, distributing the encapsulated data packets of the data flow to outgoing data flows, and wherein exactly one of the network access links is dedicated to each outgoing data flow.

24. The method of claim 19, further comprising, using the auxiliary transmitter device, on failure of one of the plurality of bundled network access links, again transmitting any lost data packets via another one of the network access links.

25. The method of claim 19, further comprising, using the auxiliary transmitter device, encapsulating the data packets of the data flow in their entireties without fragmentation.

26. The method of claim 19, wherein the an end-to-end-based transmission protocol is a TCP/IP protocol.

27. The method of claim 19, wherein the receiver device does not perform reordering of received packets from the transmitter device according to the end-to-end-based transmission protocol.

* * * * *

UNITED STATES PATENT AND TRADEMARK OFFICE
CERTIFICATE OF CORRECTION

PATENT NO. : 8,125,989 B2
APPLICATION NO. : 12/046788
DATED : February 28, 2012
INVENTOR(S) : Simon Kissel Page 1 of 1

It is certified that error appears in the above-identified patent and that said Letters Patent is hereby corrected as shown below:

Title Page, (73) Assignee should read: Viprinet GmbH, Bingen am Rhein (DE)

Signed and Sealed this
Seventeenth Day of July, 2012

David J. Kappos
*Director of the United States Patent and Trademark Office*